US007982159B2

(12) United States Patent
Winn

(10) Patent No.: US 7,982,159 B2
(45) Date of Patent: Jul. 19, 2011

(54) PLASMA ARC IGNITION USING A UNIPOLAR PULSE

(75) Inventor: Jackie L. Winn, Mt. Pleasant, SC (US)

(73) Assignee: Kaliburn, Inc., Charleston, SC (US)

(*) Notice: Subject to any disclaimer, the term of this patent is extended or adjusted under 35 U.S.C. 154(b) by 966 days.

(21) Appl. No.: 11/860,735

(22) Filed: Sep. 25, 2007

(65) Prior Publication Data

US 2009/0078686 A1 Mar. 26, 2009

(51) Int. Cl.
*B23K 10/00* (2006.01)

(52) U.S. Cl. .............................. 219/121.57; 219/121.54

(58) Field of Classification Search ............ 219/121.45, 219/121.39, 121.59, 121.54, 121.57, 75
See application file for complete search history.

(56) References Cited

U.S. PATENT DOCUMENTS

| | | | | |
|---|---|---|---|---|
| 3,641,308 | A | 2/1972 | Couch, Jr. et al. | |
| 3,781,508 | A | 12/1973 | Dauer et al. | |
| 3,914,575 | A | 10/1975 | Eichler | |
| 4,225,769 | A | 9/1980 | Wilkins | |
| 4,382,171 | A | 5/1983 | Hedberg | |
| 4,397,147 | A | 8/1983 | Turchi | |
| 4,791,268 | A | 12/1988 | Sanders et al. | |
| 4,800,716 | A | 1/1989 | Smith et al. | |
| 4,902,871 | A | 2/1990 | Sanders et al. | |
| 4,906,811 | A | 3/1990 | Buil | |
| 4,943,699 | A | 7/1990 | Thommes | |
| 5,070,227 | A | 12/1991 | Luo et al. | |
| 5,296,665 | A | 3/1994 | Peterson et al. | |
| 5,416,297 | A | 5/1995 | Luo et al. | |
| 5,660,745 | A | 8/1997 | Naor | |
| 5,828,030 | A | 10/1998 | Naor | |
| 5,831,237 | A | 11/1998 | Daniel | |
| 5,866,871 | A | 2/1999 | Birx | |
| 5,886,315 | A | 3/1999 | Lu et al. | |
| 5,897,795 | A | 4/1999 | Lu et al. | |
| 5,900,169 | A | 5/1999 | Borowy et al. | |
| 5,994,663 | A | 11/1999 | Lu | |
| 6,054,670 | A | 4/2000 | Naor | |
| 6,084,198 | A | 7/2000 | Birx | |
| 6,242,710 | B1 | 6/2001 | Naor | |
| 6,348,670 | B2 | 2/2002 | Kistersky et al. | |
| 6,486,430 | B2 | 11/2002 | Naor | |
| 6,522,087 | B1 | 2/2003 | Lu | |
| 6,903,301 | B2 | 6/2005 | Jones et al. | |
| 6,969,819 | B1 | 11/2005 | Griffin | |
| 7,186,944 | B2 * | 3/2007 | Matus et al. | 219/121.45 |
| 7,615,720 | B2 * | 11/2009 | Sanders | 219/121.57 |

* cited by examiner

*Primary Examiner* — Mark Paschall
(74) *Attorney, Agent, or Firm* — Dority & Manning, P.A.

(57) ABSTRACT

A starting circuit for use with a plasma torch is provided including circuitry for initiating a pilot arc using a unipolar voltage impulse. A transformer is selectively coupled to a DC source so that an impulse is introduced using the same DC source used to maintain an established pilot arc. A method is provided wherein an arc can be initiated while at the same time the DC source is pre-loaded so that surge injection circuitry is not needed to sustain the arc while ramping to the full pilot arc current level.

17 Claims, 3 Drawing Sheets

PLASMA ARC IGNITION USING A UNIPOLAR PULSE

FIELD OF THE INVENTION

The present subject matter relates generally to plasma cutting tools. More particularly, the present subject matter relates to an arc ignition circuit suitable for use in a plasma cutting (or other) tool.

BACKGROUND

Plasma cutting tools used to cut or otherwise operate on a workpiece generally comprise a gas nozzle with an electrode therein. Generally, plasma tools direct gas through a nozzle toward a workpiece, with some or all the gas ionized in a plasma arc between the electrode and the workpiece. The arc is used to cut or otherwise operate on the workpiece.

In most tools, a pilot arc is first established between the electrode and the nozzle. Then, the pilot arc is transferred from the nozzle to the workpiece for cutting and/or other operations. For example, some tools use contact-based starting, with the electrode and nozzle initially in electrical contact with one another. While current is passing through the electrode and nozzle, the electrode and nozzle are moved apart to create a gap. A spark across the gap initiates the pilot arc if in a successful starting operation.

Other tools use non-contact starting, which can advantageously avoid wear on the electrode that is aggravated by contact and can avoid the use of moving parts to bring the nozzle and electrode into and out of contact. Various methods and systems have been proposed to initiate the plasma arc by inducing a spark across the gap. For instance, a high frequency, high-voltage signal may be imposed across the gap between the electrode and nozzle. In certain such instances, however, the high-frequency, high-voltage signal may be problematic for at least the reason that RF interference can be introduced. RF interference may cause problems in operation of the tool, such as by feeding back into control systems. Additionally, tools that introduce RF interference must comply with regulations (e.g. FCC and/or IEC regulations) which can increase the cost and complexity of the tool.

SUMMARY

As set forth in detail below, embodiments of a plasma starting system are disclosed that can initiate a pilot arc with a single unipolar high voltage impulse. Initiating an arc in this manner provides a opportunity to eliminate the spark gap assembly used with conventional starting means as well as associated RF noise. Because the impulse can be injected in series with the output of the power source as an additive unipolar pulse, no high voltage is imposed across the power source terminals, and thus the power supply need not include additional bypass or blocking components.

The impulse starting circuit can be powered from the power source output and as such preloads the output inductor of the power source. Once the gas ionizes, a glow discharge results and the inductor current transfers from the start circuit to the torch pilot arc circuit to maintain the arc. This preloading eliminates the need for surge injection circuits of conventional starting circuits. Once the pilot arc is established, the arc can be transferred to the workpiece in any suitable manner.

BRIEF DESCRIPTION OF THE SEVERAL VIEWS OF THE DRAWINGS

A full and enabling disclosure of the present subject matter including the best mode thereof, directed to one of ordinary skill in the art is set forth more particularly in the specification, which makes reference to the appended figures, in which.

Use of like reference numerals in different features is intended to illustrate like or analogous components.

DETAILED DESCRIPTION OF THE PREFERRED EMBODIMENTS

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

Figure 1:
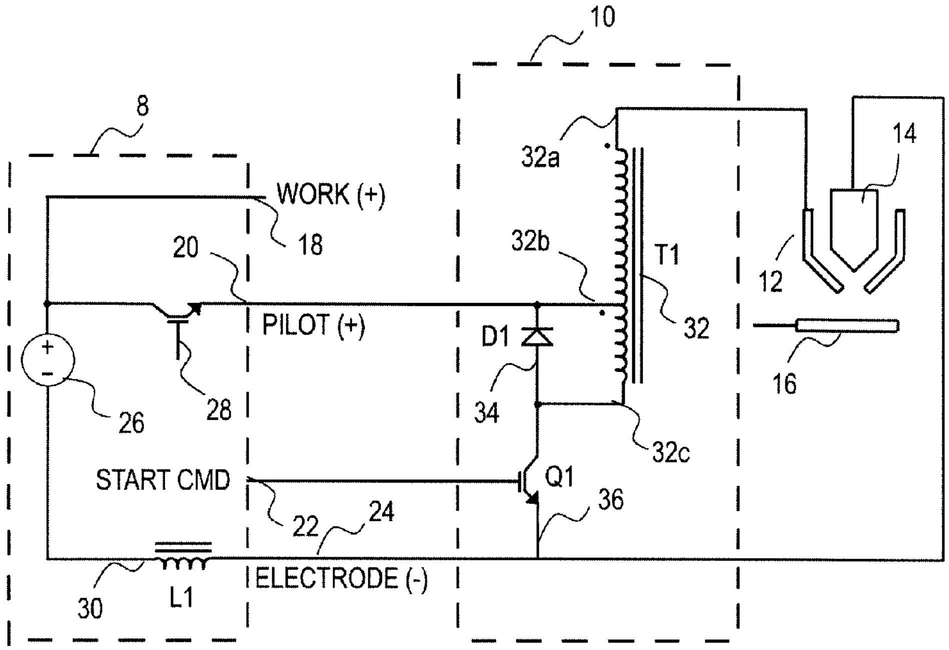
FIG. 1 is a circuit diagram illustrating components in a first exemplary embodiment of a plasma starting circuit in accordance with the present subject matter.

FIG. 1 is a circuit diagram illustrating components in a first exemplary embodiment of a plasma starting circuit in accordance with the present subject matter. In this exemplary embodiment, a plasma starting circuit is connected to nozzle 12 and electrode 14 of a plasma arc torch. FIG. 1 further illustrates power supply 8 and impulse circuit 10. As will be discussed below, impulse circuit 10 can be used to initiate a pilot arc between nozzle 12 and electrode 14 through the use of a unipolar pulse generated from the output of power supply 8.

Power supply 8 in this exemplary embodiment comprises four output connections: workpiece connection node 18, pilot arc connection node 20, start command connection node 22, and electrode connection node 24. In this example, workpiece connection node 18 and pilot arc connection node 20 are indicated as positive (+) leads, while electrode lead 24 is indicated as a negative lead (−). In these embodiments, current flows from a positive lead (or leads) to a negative lead (or leads). Of course, in other embodiments, the components of the circuit could be configured for current flow in the opposite directions to those of the examples herein.

In operation, power supply 8 can be used to produce DC output at node 18 and/or 20. Through the use of an impulse circuit, such as circuit 10 of this embodiment, the same DC source components (represented schematically at 26) can be used to initiate the pilot arc and to provide power during the cutting operation. Any suitable circuit components may be used to produce the DC output and such components of power supply 8 are not shown in FIG. 1, since the particular methodology used to generate DC power is not essential to the present subject matter. Because the same DC source is used for arc initiation and maintaining the pilot arc, separate power supplies and/or complex circuitry dedicated to different phases of operation (e.g. a spark gap assembly for arc initiation and a DC source for maintaining the arc) are not needed. Additionally, since the same DC source is used to initiate and maintain the pilot arc, surge injection circuitry is not required to maintain the arc while current ramps up since the DC power supply will be pre-loaded. DC power supply inductor 30 is illustrated to represent the output inductance of the power supply. DC supply 26 is used to initiate the pilot arc and current will already be flowing through power supply inductor 30, once the gap nozzle to electrode breaks over and the starting impulse is terminated. Thus, no surge injection circuitry is needed to maintain the arc. In conventional starting systems, the inductor current is zero when the gap breaks over and thus such systems require surge injection during ramp-up of current from zero.

Returning to FIG. 1, transistor 28 is used to switch pilot node 20 on or off to initiate or end a start sequence by selectively connecting DC source 26 to impulse circuit 10. Once a suitable arc is obtained between nozzle 12 and electrode 14, the torch can be brought in close proximity to workpiece 16 such that some of the pilot arc current transfers from the nozzle to the workpiece connection 18. Transistor 28 may then be switched off thereby forcing all of the pilot current to transfer from the nozzle 14 to the workpiece 16. Once a transferred arc has been established the power supply 8 current can be ramped up to the cutting current.

Power supply 8 is also illustrated as including start command (START CMD) output 22. This output is connected to the base of transistor 36 (Q1) to control the flow of current through transistor 36. Although transistor 36 (and transistor 28) are illustrated as Insulated Gate Bipolar Transistors (IGBT's), it will be appreciated by those of ordinary skill in the art that any suitable transistor type(s) may be used in other embodiments. Furthermore, any other suitable switching apparatus, such as relays, SCRs (with appropriate commutation for use with a DC supply), vacuum tubes, and the like may be substituted in place of either transistor.

Start command output 22 is used to control the operation of impulse circuit 10. Generally, impulse circuit 10 may be used in a starting operation that transitions from an initial "impulse" stage that establishes the arc to a "pilot arc" stage that sustains the pilot arc. However, both stages use some of the same components, with current flow directed using transistor 36 via signals from start command output 22. Start command output 22 may be provided in any suitable way. In an exemplary configuration, start command output 22 may be provided using a binary signal of sufficient voltage to switch transistor 36 from an "off" state to an "on" state. The binary signal may be generated by a control program and/or by a physical control such as a switch or button used by an operator. Alternatively, it is conceivable to use other circuitry, such as an output provided by a digital to analog converter (D/A) responsive to a signal generated by a control program.

Impulse circuit 10 in this embodiment comprises transformer 32, which may correspond to an autotransformer having a primary winding between nodes 32*b* and 32*c* and a secondary winding between nodes 32*a* and 32*b*. Node 32*b* of transformer 32 is connected to output node 20 of power supply 8 (PILOT (+)). Those of ordinary skill in the art will appreciate that although an autotransformer is employed in this exemplary embodiment, any suitable type or configuration of a transformer could be used in other embodiments. For instance, a transformer with separate primary and secondary windings could be used instead of an autotransformer.

Impulse circuit 10 further includes Diode 34 (D1) connected between the terminals 32*b* and 32*c* of the primary winding of transformer 32. Diode 34 is connected so as to be reverse-biased when voltage from node 32*b* to node 32*c* (i.e. voltage across the primary winding of transformer 32) is positive. Transistor 36 is connected to serve as a switch or gate between node 32*c* and electrode lead 24 (i.e. the negative terminal of power supply 8). In this embodiment, the output terminal 32*a* of transformer 32 is connected to nozzle 12 so that nozzle 12 is connected in series with the secondary side of transformer 32.

Figure 3:
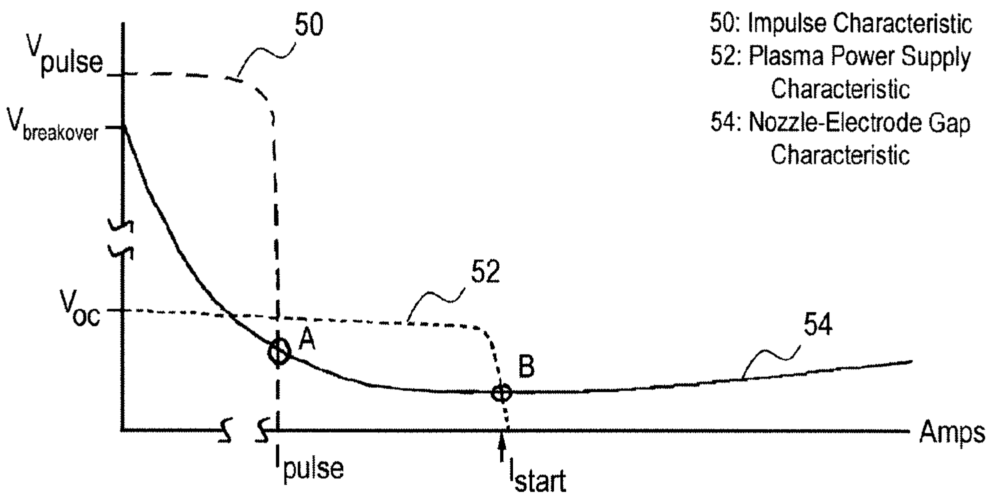
FIG. 3 is a graph of static characteristics achieved in a first exemplary mode of operation.

An exemplary arc ignition operation that may be achieved using the circuits shown in FIG. 1 will now be discussed in conjunction with FIG. 3. FIG. 3 shows three static characteristics of various portions of the impulse starting circuit. The voltage-current characteristic of the power supply is shown at 52. The voltage/current impulse applied to the gap between nozzle 12 and electrode 14 is shown at 50. Finally, the gap characteristic is shown at 54.

In operation, the pilot output 20 of power supply 8 is energized by activating the internal components of the power supply represented by DC source 26 and by connecting DC source 26 to output 20 via one or more switches, such as by energizing transistor 28. Once the power supply is energized and the start command is applied to transistor 36, the open circuit voltage of power supply 8 ($V_{OC}$ as shown in FIG. 3) is applied to the primary of transformer 32. As noted above, the voltage/current characteristic of the power supply is shown at 52. The initial influx of current will induce a voltage from nozzle 12 to electrode 14 equal to $V_{OC}*(1+N_{transformer})$, where $N_{transformer}$ is the turns ratio of transformer 32 (i.e. $N_{transformer}=N_{secondary}/N_{primary}$). This impulse is shown at voltage/current characteristic 50 in FIG. 3 where $I_{pulse}$ is equal to $I_{start}/(N_{transformer}+1)$. $I_{start}$ may be less than greater than, or equal to the normal pilot arc current. Once the impulse stage has completed and Q1 is turned off, $I_{start}$ can be stepped or ramped up or down to the normal pilot current level if not the same.

In this embodiment of the present subject matter, the required voltage to create an arc across the gap defined by nozzle 12 and electrode 14 is referred to as $V_{breakover}$. The impulse voltage required to break over the gap nozzle to electrode is a function of factors such as the physical gap distance, the type of gas, and gas flow characteristics. For instance, higher flow rates require higher voltages; therefore, the optimal flow for starting is 0-30 CFH. This is the flow between the nozzle and electrode—typically stated as plasma flow. The total gas flow to the torch can be much greater as the total flow is composed of the plasma and shield gas for a single gas torch.

Once the gap between nozzle 12 and electrode 14 breaks down, current starts to flow from pilot output 20 through the secondary of transformer 32 (i.e. from 32*b* to 32*a*), across the gap from nozzle 12 to electrode 14, and back to power supply 8 via electrode output 24. The decline in voltage and increase in current across the gap (due to the negative resistance characteristics of a plasma arc) is shown at 54 in FIG. 3.

Eventually, point "A" shown in FIG. 3 is reached, which represents the end of the "impulse" stage. Once an arc is established, transistor 36 is turned "off" to begin the "pilot arc" stage, which includes the transition from point A to point B. Once transistor 36 is turned "off" the conductive path from node 32*c* to node 24 is no longer available. However, due to the current flow through inductor 30, a reverse voltage is induced across the secondary of transformer 32 to induce current flow. The secondary voltage will be clamped by diode 34, with the maximum secondary voltage equal to $V_{diode}*N_{transformer}$). Thus current continues to flow from pilot output 20 through the secondary of transformer 32 (i.e. from 32*b* to 32*a*), across the gap, and back through inductor 30 of power supply 10. Since a current equal to $I_{pulse}*(N_{transformer}+1)$ is already flowing through inductor 30 when transistor 36 is turned "off", no additional surge injection is required to provide sufficient DC voltage/current to maintain the arc while transitioning to the normal pilot arc state. Once point "B" is reached, and the arc is transferred to workpiece 16 by bringing the torch in close proximity, transistor 28 can be deactivated.

Use of embodiments discussed in the examples above may result in advantages including, but not limited to: a reduction in RF noise generated which may affect the power supply and surrounding equipment; elimination or reduction of the need for a shunt filter or blocking choke at power supply to protect internal components; preloading of the power supply output inductor which eliminates surge injection and provides a more positive start (typically, a single impulse is required to initiate the pilot arc versus multiple discharges with a conventional system using a spark gap); and ability to use a more compact design which facilitates mounting of components closer to the torch.

However, in the examples above, the secondary winding generally carries the pilot arc current which can significantly increase the size and cost of the transformer. Additionally, diode 34 (D1) conducts a relatively high current ($I_{pilot}*N_{transformer}$). Finally, a high energy pulse can result in higher RF intensity and possible safety concerns.

Figure 2:
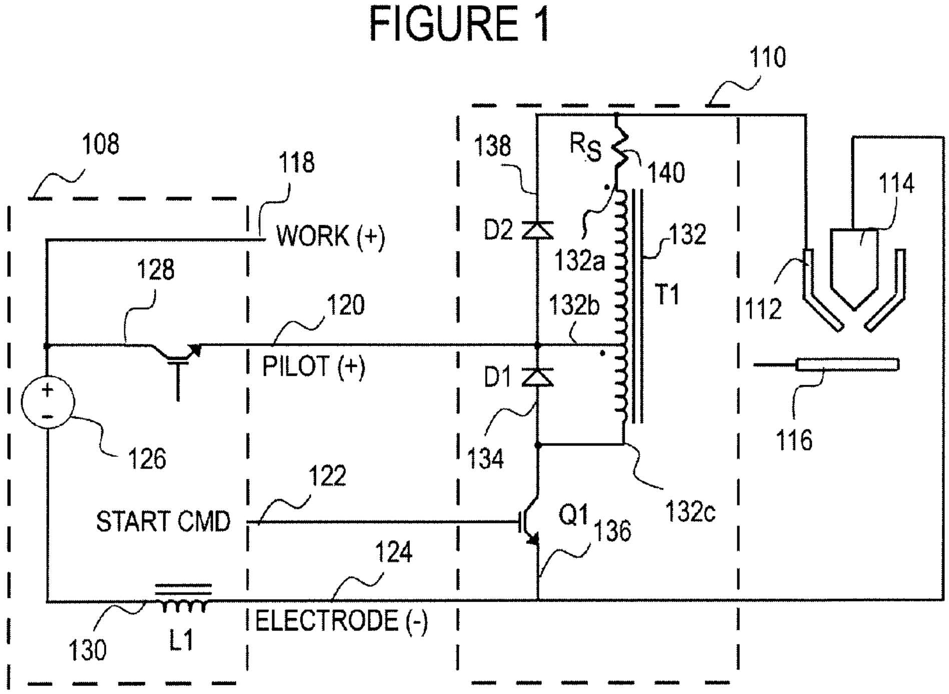
FIG. 2 is a circuit diagram illustrating a second exemplary embodiment of a plasma starting circuit.
Figure 4:
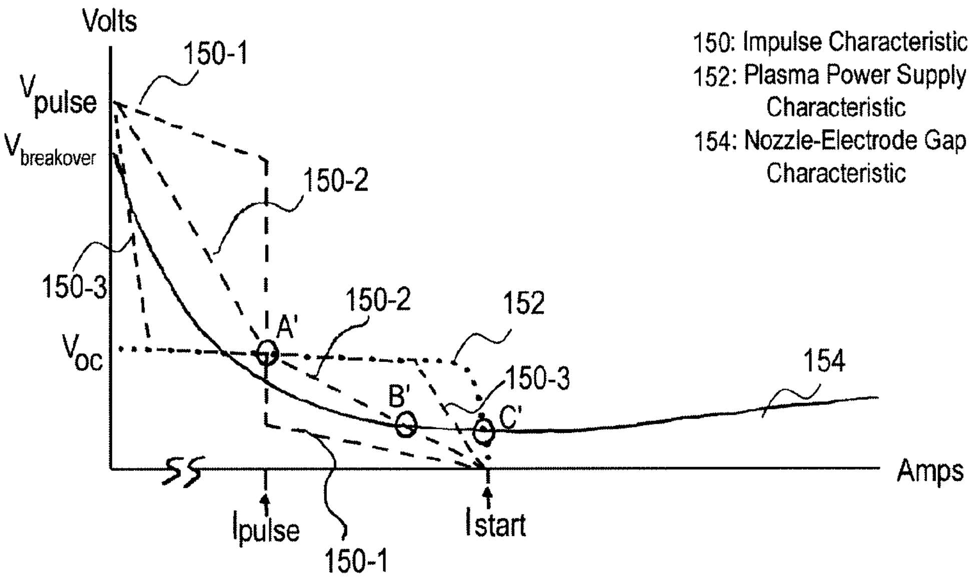
FIG. 4 is a graph of static characteristics achieved in a second exemplary mode of operation.

Turning now to FIG. 2, another exemplary embodiment of an impulse starting circuit is shown, the use of which may address some of the foregoing concerns while still providing improvements over other starting circuits. As will be discussed further below, FIG. 4 shows several static characteristics that may be achieved using various portions of the impulse starting circuit. It will be apparent that circuit 110 of FIG. 2 could be substituted in place of circuit 10 in FIG. 1. However, different numbers are used for all components for purposes of clarity in the explanation below.

In this example, the plasma starting circuit is connected to a nozzle 112 and electrode 114 of a plasma arc torch. FIG. 2 further illustrates power supply 108 and impulse circuit 110. As will be discussed below, impulse circuit 110 is provided to initiate a pilot arc between nozzle 112 and electrode 114 by generating a unipolar pulse from the output of power supply 108.

Power supply 108 in this exemplary embodiment of the present subject matter comprises four output connections: workpiece connection node 118, pilot arc connection node 120, start command connection node 122, and electrode connection node 124. Workpiece connection node 118 and pilot arc connection node 120 are indicated as positive (+) leads, while electrode lead 124 is indicated as a negative lead (−). In this configuration, current flows from a positive lead (or leads) to a negative lead (or leads). Of course, in other embodiments, the components of the circuit could be configured for current flow in the opposite directions to those of the examples herein.

In operation, power supply 108 provides a DC output at node 118 and/or 120. Through the use of an impulse circuit, such as circuit 110, the same DC source components (represented schematically at 126) can be used to initiate the pilot arc and to provide power during the cutting operation. Any suitable circuit components may be used, however, to produce the DC output and such components of power supply 108 are not shown in FIG. 2, since the particular methodology used to generate DC power is not essential to an understand of the present subject matter and would be well known by those of ordinary skill in the art.

Because the same DC source is used for arc initiation and powering the arc during the cutting operation, separate power supplies and/or complex circuitry dedicated to different phases of operation (e.g. a spark gap assembly for arc initiation and a DC source for cutting) are not needed. Since DC supply 126 is used to initiate the pilot arc, current will already be flowing through power supply inductor 130 once the gap nozzle to electrode breaks over and the starting impulse is terminated, and thus no surge injection circuitry is needed to maintain the arc. With conventional starting systems, the inductor current is zero when the gap breaks over and thus the need for surge injection during ramp up of current from zero.

Returning to FIG. 2, transistor 128 is provided to switch pilot node 120 on or off to initiate or end a start sequence by selectively connecting DC source 126 to impulse circuit 110. Once a suitable arc is obtained between nozzle 112 and electrode 114, then the torch can be brought in close proximity to the workpiece 116 such that some of the pilot arc current transfers from the nozzle to the workpiece connection 118. Then, transistor 128 can be switched off forcing all of the pilot current to transfer from the nozzle 114 to the workpiece 116.

Power supply 108 is also illustrated as including start command (START CMD) output 122. This output is connected to the base of transistor 136 (Q1) to control the flow of current through transistor 136. Although transistors 128 and 136 are illustrated as Insulated Gate Bipolar Transistors (IGBT's), any suitable transistor type(s) may be used in other embodiments. Furthermore, any other suitable switching apparatus, such as relays, SCRs, vacuum tubes, and the like may be substituted in place of either one or both transistors.

Start command output 122 is used to control the operation of impulse circuit 110. Generally speaking, impulse circuit 110 can be used in a starting operation that transitions from an initial "impulse" stage that establishes the arc to a "pilot arc" stage that sustains the pilot arc. However, both stages use some of the same components, with current flow directed using transistor 136 (via signals from start command output 122). Additionally, as discussed below, the current path in this embodiment is varied to avoid high current levels in transformer 132. Start command output 122 may be provided in any suitable way. In one exemplary embodiment, start command output 122 may be provided using a binary signal of sufficient voltage to switch transistor 136 from an "off" state to an "on" state. The binary signal may be generated by a control program and/or by a physical control such as a switch or button used by an operator. Alternatively, other circuitry, such as an output provided by a digital to analog converter (D/A) responsive to a signal generated by a control program may be employed.

Impulse circuit 110 in this example comprises transformer 132, which may comprise an autotransformer having a primary winding between nodes **132*b* and 132*c* and a secondary winding between nodes 132*b* and 132*a*. Node 132*b* of transformer 132 is connected to output node 120 of power supply 108** (PILOT (+)). Although an autotransformer is shown in this example, any suitable type or configuration of a transformer could be used in other embodiments. Alternative transformers, for instance, a transformer with separate primary and secondary windings could be used instead of an autotransformer.

Impulse circuit 110 further includes Diode 134 (D1) connected between the terminals **132*b* and 132*c* of the primary winding of transformer 132. Diode 134 is connected so as to be reverse-biased when voltage from node 132*b* to node 132*c* (i.e. voltage across the primary winding of transformer 132) is positive. Transistor 136 is connected to serve as a switch or gate between node 132***c* and electrode lead 124 (i.e. the negative terminal of power supply 108).

In accordance with this exemplary embodiment of the present subject matter, output terminal 132*a* of transformer 132 is connected to nozzle 112 through series resistance 140 (RS). Additionally, diode 138 (D2) is connected between terminal 132*b* of transformer 132 and node 112 so that diode 138 is in parallel with the secondary of transformer 132 and series resistance 140. Diode 138 is connected so as to be forward-biased when the voltage from pilot output 120 to nozzle 112 is positive. Thus, as will be discussed below, once an arc is established, diode 138 serves as a means to shunt current away from the secondary winding of transformer 132 when diode 138 is forward-biased. Series resistance 140 may be used to induce commutation of current from the secondary winding of transformer 132 to diode 138. If the commutation voltage $$i_{impulse} \cdot \frac{R_S}{N_{transformer}}$$

is greater than that of the gap at the current where the impulse static characteristic intersects that of the power supply, current will commutate from the secondary of transformer 132 to diode 138 due to the negative resistance characteristic of the nozzle-electrode gap once an arc is established. On the other hand, however, the impulse static characteristic must exceed that of the gap at a sufficient current so that a glow discharge and transition to an arc can be achieved.

An exemplary arc ignition operation that may be achieved using the circuits shown in FIG. 2 will now be discussed in conjunction with FIG. 4. FIG. 4 shows several static characteristics of various portions of the impulse starting circuit. The nozzle-electrode gap characteristic is shown at 154, and the power supply characteristic is shown at 152.

FIG. 4 shows three impulse static characteristics labeled 150-1, 150-2 and 150-3, illustrating alternative voltage/current impulses applied to the gap between nozzle 112 and electrode 114. Each respective characteristic represents operation using increasing series resistance $R_s$. Characteristic 150-1, with the lowest relative value of $R_S$ of these examples, has a commutation voltage less than that of the gap and as such operation would be the same as discussed in the examples above in conjunction with FIGS. 1 and 3. Characteristic 150-3, with the highest relative value of $R_S$ of these examples, does not exceed that of the gap at a sufficient current so that a glow discharge and transition to an arc can be achieved and as such would not sustain the arc once the gap breaks over. Characteristic 150-2 will be used to describe examples of circuit operation, but does not imply optimum operation, which will ultimately be a function of the particular torch, power supply components, and operating parameters which are desired.

In operation, the pilot output 120 of power supply 108 is energized by activating the internal components of the power supply represented by DC source 126 and by connecting DC source 126 to output 120 via one or more switches, such as by energizing transistor 128. Once the power supply is energized and a start command is applied to transistor 136 (in this example, by providing a sufficient voltage to render transistor 136 conductive), then the open circuit voltage of power supply 108 ($V_{OC}$ as shown in FIG. 4) is applied to the primary of transformer 132. As noted above, the voltage/current characteristic of the power supply is shown at 152. The initial influx of current will induce a voltage from nozzle 112 to electrode

114 equal to $V_{OC}*(1+N_{transformer})-V_{SR}$, where $N_{transformer}$ is the turns ratio of transformer 132 (i.e. $N_{transformer}=N_{secondary}/N_{primary}$) and $V_{SR}$ is the voltage drop across series resistance 140. This impulse is shown at voltage/current characteristic 150 in FIG. 4. Of course, until an arc forms and current begins to flow across the gap, $V_{SR}$ will be equal to zero.

In this example, the required voltage to create an arc across the gap defined by nozzle 112 and electrode 114 is referred to as $V_{breakover}$. As was noted above, the impulse voltage required to break over the gap nozzle to electrode is a function of the physical distance, type of gas and gas flow. Once the gap between nozzle 112 and electrode 114 breaks down, current starts to flow from pilot output 120 through the secondary of transformer 132 (i.e. from 132*b* to 132*a*), across the gap from nozzle 112 to electrode 114, and back to power supply 108 via electrode output 124. The decline in voltage and increase in current across the gap is shown at 154 in FIG. 4. Once current begins to flow, operating point A' shown in FIG. 4 is reached where the static Impulse characteristic 150 intersects that of the Power Supply 152. As the voltage continues to decrease below $V_{oc}$ approaching point B', diode D2 becomes forward biased and current will begin to flow through D2 shunting the secondary of T1. At the same time, the voltage 132*b* to 136 is clamped to the voltage 112 to 114 through D2 reducing the primary voltage 132*b* to 132*c*. This in turn reduces the secondary voltage and the current supplied through the secondary as a result of transformer action. The net result is that current is commutated away from the secondary winding to D2 as operating point B' is achieved.

Point B' represents the end of the "impulse" stage. Once an arc is established, transistor 136 can be turned "off" to begin the "pilot arc" stage, which includes the transition from point B' to point C'. The current $I_{start}$ at point C' is the commanded output current from the power supply. This current may be less than, greater than, or equal to the normal pilot arc current level. If not equal, the commanded current would be stepped or ramped from the start level to the pilot level as or after the instant transistor 136 is turned off. Once transistor 136 is turned "off" the conductive path from node 132*c* to node 124 is no longer available. However, current continues to flow from pilot output 120, through diode 138, across the nozzle-electrode ionized gap, and back to the power supply through output 124.

Since a current equal to $I_{start}$ is already flowing through inductor 130 at the end of the "Impulse" stage, no additional surge injection is required to provide sufficient DC voltage/current to maintain the arc while transitioning to the normal pilot arc state. When a cutting operation is to begin, the torch can be brought in close proximity to the workpiece 116 and transistor 128 can be deactivated.

In some embodiments of the present subject matter, the start command output can be provided beyond the "Impulse" stage, thus keeping the primary of transformer 132 connected across the output of power supply 108. By holding the start command on for such a period, if the pilot arc extinguishes for any reason, a voltage spike due to the −di/dt in the output inductor is imposed across the primary of transformer 132 and a corresponding high voltage pulse is induced on the secondary to force current flow nozzle to electrode. However, the start command output should be terminated (i.e. transistor 136 switched "off") before the volt-sec product of the core is exceeded and transformer 132 becomes saturated.

In contrast to the exemplary embodiments discussed above in conjunction with FIGS. 1 and 3, the embodiments discussed in conjunction with FIGS. 2 and 4 may provide further advantages including, but not limited to: avoiding high current in the secondary winding of transformer 132; ability to use a smaller gauge wire in the secondary of transformer 132 to achieve series resistance 140, which can result in a more compact transformer; avoiding the need for high current in diode 134; and limitation to the pulse energy level, which can reduce RF interference and enhance safety.

It will be appreciated by those of ordinary skill in the art that diode 138 will carry the pilot arc current and for continuous pilot operation may require some means for cooling. Since many torches are cooled using a fluid or fluids, such as water or gas, such torches can include a manifold assembly to introduce the gas and/or water to the torch. Diode 138 (or diodes 138 if multiple diodes are used in series) can be mounted in contact with the manifold assembly to provide a means of forced cooling. Of course, a dedicated cooling assembly can be used for diode(s) 138 and/or any other components of the impulse starting circuit.

Additionally, since diode 138 blocks the peak pulse voltage, a diode with a rated blocking voltage of several kilovolts may be required. If single diodes are not readily available at those voltages, a string of diodes in series with appropriate means for assuring voltage sharing can be used. Similarly, a string of diodes may be used for either or both of diodes 34 or 134 if needed.

Series resistance 140 may be provided in any suitable way. Although the examples herein discuss using smaller gauge wire to achieve a resistance effect, any other means of limiting current through the secondary of transformer 132 can be employed such as series resistance, magnetic shunt, and the like.

Figure 5:
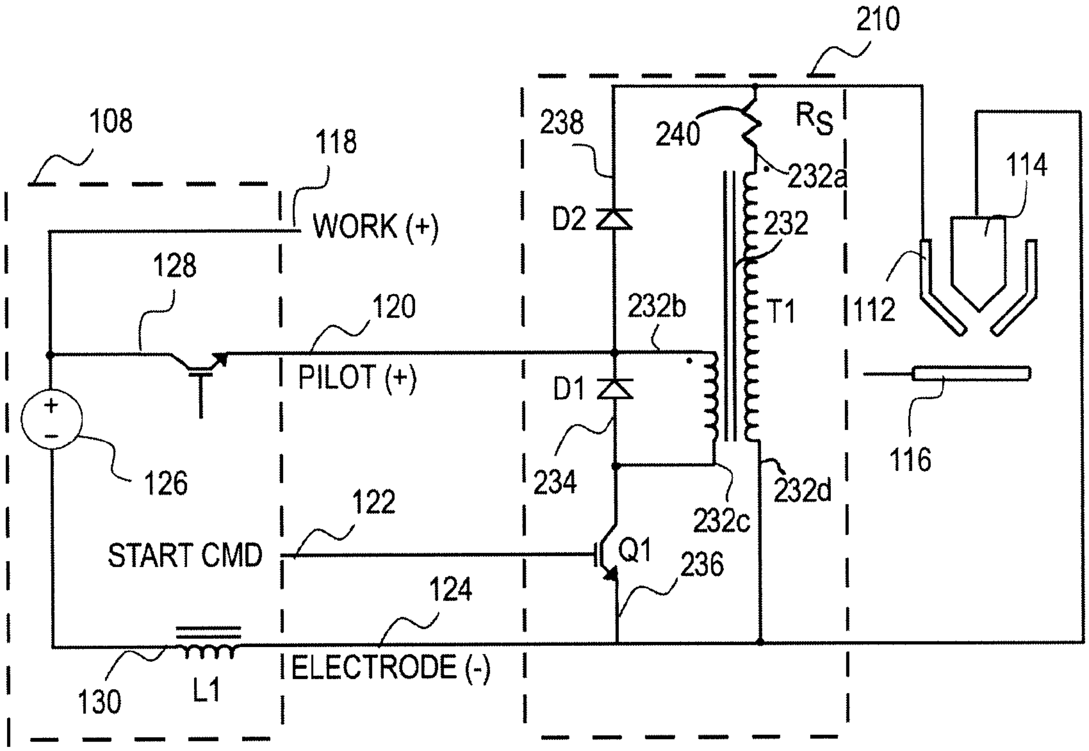
FIG. 5 is a circuit diagram illustrating a third exemplary embodiment of a plasma starting circuit in accordance with the present subject matter.

Briefly turning to FIG. 5, a third exemplary embodiment of a plasma starting circuit 210 is illustrated. In this example, circuit 210 has been substituted in place of circuit 110 shown in FIG. 2. Circuit 210 comprises two diodes 234 and 238, a series resistance 240, transistor 236, and a transformer 232. In this example, transformer 232 comprises a primary winding between nodes **232*b* and 232*c* and a secondary winding between nodes 232*a* and 232*d*. Node 232*d* is connected to negative electrode 124 and electrode 114 in this example. As shown at 238, diode D2 is connected between node 232*b* (pilot node 120) and the nozzle 112 of the torch so as to be forward-biased when current flows from node 232*b* (pilot node 120) toward nozzle 112. Since transformer 232 comprises two separate windings in this embodiment, D2 is necessary in order to provide a path from the pilot terminal to nozzle 112 once transistor 236 (Q1**) is switched off.

It should be appreciated by those of ordinary skill in the art that what has been particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of ordinary skill in the art.

What is claimed:

1. A method of initiating a plasma arc in an apparatus comprising an arc gap defined by a first gap side and second gap side, the method comprising:

generating a DC pilot current from a DC power supply, the power supply comprising a pilot current output and a return current input;

generating a voltage impulse by directing current along an initial current path from the pilot current output and back to the return current input;

injecting the voltage impulse in series with the pilot current output and the first gap side to generate an arc across the first and second gap sides;

directing current flow through a second current path from the pilot output to the first gap side, across the gap to the second gap side, and back to the return current input without injecting current from any components outside the initial or second current flow paths; and discontinuing current flow along the initial current path at or shortly after current flow begins through the second current path;

whereby both the initial and the second current flow paths comprise the DC power supply.

2. The method as set forth in claim 1, wherein:

directing current flow along an initial path comprises directing current flow through the primary winding of a transformer, the transformer comprising a primary winding and a secondary winding; and injecting the voltage impulse comprises injecting the voltage pulse in series via a connection between the secondary winding of the transformer and the first gap side.

3. The method as set forth in claim 2, wherein directing current flow through a second current path comprises directing current flow through a diode biased for current flow from the pilot current output to the first gap side.

4. The method as set forth in claim 2, wherein directing current flow through the primary of a transformer comprises directing current flow through the primary of an autotransformer and wherein directing current flow through a second current path comprises directing current flow through the secondary winding of the transformer.

5. The method as set forth in claim 4, further comprising:

shunting current from the secondary winding of the transformer to the first side gap side via a shunt path parallel to the secondary winding of the transformer.

6. The method as set forth in claim 5, wherein shunting current comprises providing a diode biased for current flow from the pilot current output to the first gap side.

7. The method as set forth in claim 1, wherein directing current along an initial current path comprises changing the conductivity of at least one switching component in the initial current path.

8. The method as set forth in claim 7, wherein directing current comprises changing the conductivity of a transistor connected between a winding of the transformer and the return current input of the DC power supply.

9. The method as set forth in claim 1, further comprising:

providing a plasma gas flow through the area defined by the first gap side and the second gap side is in the range of 0-30 CFH.

10. An arc initiation circuit comprising:

a transformer having a primary winding coupled between a first node and second node and a secondary winding coupled between a third node and a fourth node;

a first diode connected between the first node and the second node, the first diode connected so as to be forward-biased for current flowing through the diode from the second node toward the first node;

a transistor connected between the second node and a fifth node; and a DC power supply connected to the first node and the fifth node;

wherein a plasma torch nozzle at a sixth node is in electrical communication with the third node and a plasma torch electrode is connected to the fifth node.

11. The arc initiation circuit as set forth in claim 10, wherein the third node and sixth node are the same node and the fourth node and the fifth node are the same node.

12. The arc initiation circuit as set forth in claim 10, wherein the third node and sixth node are the same node and the fourth node and the first node are the same node.

13. The arc initiation circuit as set forth in claim 10, wherein the third node is connected to the sixth node through a series resistance and the fourth node and the fifth node are the same node.

14. The arc initiation circuit as set forth in claim 10, wherein the third node is connected to the sixth node through a series resistance and the fourth node and the first node are the same node.

15. The arc initiation circuit as set forth in claim 11, further comprising a second diode connected between the first node and the sixth node, the second diode connected so as to be forward-biased for current flowing through the diode from the first node towards the sixth node.

16. The arc initiation circuit as set forth in claim 12, further comprising a second diode connected between the first node and the sixth node, the second diode connected so as to be forward-biased for current flowing through the diode from the first node towards the sixth node.

17. A plasma cutting system comprising the arc initiation circuit as set forth in claim 15 and a gas manifold assembly, wherein the second diode is positioned for cooling by the gas manifold assembly.

* * * * *